United States Patent
Eckert et al.

(10) Patent No.: US 10,480,560 B2
(45) Date of Patent: Nov. 19, 2019

(54) WOOD SCREW WITH INTERMEDIATE THREAD SECTIONS TAPERING TO THE FRONT

(71) Applicant: Adolf Würth GmbH & Co. KG, Künzelsau (DE)

(72) Inventors: Rainer Eckert, Weikersheim (DE); Andreas Wunderlich, Kupferzell (DE)

(73) Assignee: ADOLF WÜRTH GMBH & CO. KG, Künzelsau (DE)

( * ) Notice: Subject to any disclaimer, the term of this patent is extended or adjusted under 35 U.S.C. 154(b) by 432 days.

(21) Appl. No.: 14/903,572

(22) PCT Filed: Jun. 25, 2014

(86) PCT No.: PCT/EP2014/063399
§ 371 (c)(1),
(2) Date: Jan. 7, 2016

(87) PCT Pub. No.: WO2015/003906
PCT Pub. Date: Jan. 15, 2015

(65) Prior Publication Data
US 2016/0146241 A1 May 26, 2016

(30) Foreign Application Priority Data
Jul. 8, 2013 (DE) .......... 10 2013 213 338

(51) Int. Cl.
*F16B 33/00* (2006.01)
*F16B 25/10* (2006.01)
*F16B 25/00* (2006.01)

(52) U.S. Cl.
CPC ........ *F16B 25/103* (2013.01); *F16B 25/0015* (2013.01); *F16B 25/0047* (2013.01)

(58) Field of Classification Search
USPC ........... 411/411, 387.3, 424, 425, 387.1, 426
See application file for complete search history.

(56) References Cited

U.S. PATENT DOCUMENTS 74,489 A * 2/1868 Bidwell
RE3,941 E * 4/1870 Pierce .......................... 411/406
(Continued)

FOREIGN PATENT DOCUMENTS

CH 7671 10/1893
DE 42231546 * 3/1994 .......... F16B 25/0015
(Continued)

OTHER PUBLICATIONS

English translations of the Abstracts of the cited Foreign Patent Documents.

*Primary Examiner* — Gary W Estremsky
(74) *Attorney, Agent, or Firm* — Robert A. Blaha; Smith Tempel Blaha LLC

(57) ABSTRACT

Wood screw for predrilling-freely inserting into a wood base, in particular into a massive wood base, wherein the wood screw comprises a shaft portion with a thread which is self-cutting in wood, a screw head which is connected to the shaft portion directly or indirectly at a back side, and a screw tip which is connected to the shaft portion directly or indirectly at a front side, for predrilling-freely penetrating into the wood base, wherein at the shaft portion between neighboring thread turns, portions are formed which taper towards the screw tip.

20 Claims, 4 Drawing Sheets

(56) References Cited

U.S. PATENT DOCUMENTS

| | | | | |
|---|---|---|---|---|
| 1,235,626 | A | * | 8/1917 | Woodward .......... F16B 25/0078 411/421 |
| 1,801,186 | A | * | 4/1931 | Arenz ..................... F16B 15/06 411/394 |
| 4,334,814 | A | * | 6/1982 | McKewan ............. B21H 3/027 411/311 |
| 4,544,313 | A | * | 10/1985 | Grossberndt ....... F16B 25/0047 411/411 |
| 4,652,194 | A | * | 3/1987 | Tajima ................... F16B 25/00 411/386 |
| 4,756,653 | A | * | 7/1988 | Berger ................ F16B 23/0038 411/386 |
| 4,763,456 | A | | 8/1988 | Giannuzzi |
| 4,892,429 | A | * | 1/1990 | Giannuzzi ............. E04D 3/3603 411/383 |
| 5,425,407 | A | | 6/1995 | Archuleta et al. |
| 5,569,009 | A | * | 10/1996 | Suzuki ................ F16B 25/0031 411/307 |
| 5,800,107 | A | * | 9/1998 | Giannuzzi ............... F16B 25/00 411/386 |
| 5,885,041 | A | * | 3/1999 | Giannuzzi ............. F16B 13/141 411/258 |
| 5,891,146 | A | * | 4/1999 | Simon .................. A61B 17/863 411/414 |
| 6,083,227 | A | | 7/2000 | Saurat et al. |
| 6,264,677 | B1 | * | 7/2001 | Simon ................ A61B 17/0401 411/414 |
| 6,419,436 | B1 | * | 7/2002 | Gaudron ................. F16B 25/00 411/411 |
| 6,565,302 | B2 | * | 5/2003 | Werner ................... F16B 25/00 411/411 |
| 7,713,013 | B2 | * | 5/2010 | Sedgwick ................ A47G 1/20 411/402 |
| 8,403,972 | B2 | * | 3/2013 | Hasenbohler ........ A61B 17/863 411/411 |
| 2008/0080953 | A1 | * | 4/2008 | Wu ..................... F16B 25/0015 411/412 |
| 2012/0034048 | A1 | * | 2/2012 | Karupaya .............. B21H 3/027 411/402 |
| 2014/0023457 | A1 | * | 1/2014 | Gaudron ............ F16B 25/0026 411/424 |
| 2015/0147137 | A1 | * | 5/2015 | Ban ....................... F16B 25/106 411/387.8 |

FOREIGN PATENT DOCUMENTS

| | | |
|---|---|---|
| DE | 202 10 464 U1 | 10/2002 |
| DE | 10 2006 020 630 A1 | 11/2007 |
| DE | 10 2010 028 344 A1 | 11/2011 |
| EP | 0 012 441 A1 | 6/1980 |
| EP | 0 243 526 A1 | 11/1987 |
| EP | 0 589 398 A1 | 3/1994 |
| EP | 0 589 399 A1 | 3/1994 |
| JP | 2000074026 A | 3/2000 |
| JP | P2003-42121 A | 2/2003 |
| TW | 415292 U | 12/2000 |

* cited by examiner

WOOD SCREW WITH INTERMEDIATE THREAD SECTIONS TAPERING TO THE FRONT

TECHNICAL FIELD

The invention relates to a wood screw, a method for inserting a wood screw into a wood base, a method of manufacturing a wood screw and a use.

BACKGROUND

A screw is a bolt which may comprise a drive, wherein the bolt is provided with a thread at the outside. In screws with a head, the annular area under the head serves as a stop against the part to be fixed with it.

DE 27 54 870 A1 discloses a self-tapping screw of a kind which has a good hold in chipboards. Such a screw has a self-tapping thread, wherein a constriction is formed between two thread turns. Material can migrate into the constriction or indentation, which is displaced by the thread turns, whereby the load-bearing capacity shall be increased. The thread portion is arranged between a head and an end which may have a drilling tip. A screw with the drilling tip may be used for drilling holes into metal sheets, wherein, after the drilling tip passes through, the screw is directly screwed into the borehole.

DE 10 2006 020 630 A1 discloses a screw for fixing a plastic window frame to a window reveal made of wood. The screw has a screw head and a screw tip with a cutting notch, wherein a screw thread region with a coarse thread is provided between the screw head and the screw tip.

DE 202 10 464 U1 discloses a screw, in particular for a use with wood, with a shaft which is provided with an outer thread, wherein a respective thread valley between two thread hills is formed arch-shaped. The thread valley may be formed with chamfers between the thread hills. By the thread valleys formed like this, the torque and the bendability of the screw shall be increased and a breakage shall be avoided.

CH 7671 A discloses a wood screw with a thread made of thread turns which are formed of a concave boundary line at a back side and a boundary line at a front side. These thread turns are arranged between a head and a tapered, peaked end.

EP 0 243 526 A1 discloses a hammering in screw with a head and a shaft portion provided with thread webs. An end of the hammering in screw is flattened. Between the windings of the thread web, a substantially cylindrical shaft wall area is provided, respectively. For setting the hammering in screw, machine-made prefabricated accommodation bores for the hammering in screw are provided in a blind frame and a sash frame, respectively.

From EP 0,589,398 B1 and DE 10 2010 028 344 A1, respectively, for a base made of plastic or a light metal, it is known to screw a screw with a thread into the base, wherein non-cylindrical core portions are arranged between the thread turns, which taper towards the screw head. Thereby, the material of the base made of plastic or light metal, which is displaced when screwing in, shall merely flow to a backward direction, longitudinally to each core portion, up to the core portion having the smallest diameter, to enable a reduced screwing in torque of the screw when screwing in, after a predrilling which is normally performed previously.

For inserting a screw into a base made of plastic, it is intended to predrill a hole into the plastic base, and to provide this when molding (original forming), respectively, and to subsequently screw a screw into the hole. The hole is predrilled with a diameter which is larger than the shaft diameter of the screw. Portions of a screw for a plastic base may have a shape between neighboring thread turns, which deviates from a circular cylinder geometry. At a screw from the company Reyher, referred to as RST, for screwing into a predrilled plastic base, portions of the screw between neighboring thread turns may be formed tapering away from the screw head towards the opposite screw end. Descriptively, the high thread turns of such screws for plastic bases cut into the plastic material which abuts upon the predrilling bore hole. In other words, the anchorage effect of such screws is merely based on the anchorage of the thread turns in the predrilled base, whereas the screw shaft in the predrilled bore hole is substantially exposed.

Entirely different technical principles and physical framework conditions as for bases made of plastic or light metal apply for inserting a screw into wood. When inserting a screw into wood, the forming of a predrilling is normally omitted, instead, a wood screw is typically predrilling-freely screwed into a massive wood base. The thread of a wood screw cuts its counter thread into the wood base by itself. An example for a known wood screw is the screw Assy Plus or Assy 3.0 distributed by the company Würth. A measure for the quality of the anchorage of a wood screw in a wood base is the pull-out value. It denotes the tensile force which is required for pulling the wood screw out of the wood base, therefore for overcoming the holding force of the wood screw in the wood base.

Even though the known wood screw of the type Assy Plus and Assy 3.0, respectively, shows good pull-out values, a further improved pull-out strength of a wood screw is nevertheless desirable.

SUMMARY

There may be a need for a wood screw with an improved holding force.

According to an embodiment of the present invention, a wood screw (i.e. a screw for a wood base, wherein the screw itself preferably is not made of wood) is provided for predrilling-freely (i.e. without previously making a bore hole before inserting the screw into the base) inserting into a wood base, wherein the wood screw comprises a shaft portion with a (for example single-start or multi-start) thread (which may be formed of thread turns running spirally around a screw core) which is self-cutting in wood, a screw head (which may be radially widened with respect to the shaft portion) which is connected to the shaft portion at a back side (with respect to an inserting direction of the wood screw into the base) directly (i.e. without a further component arranged in between) or indirectly (i.e. with a further component arranged in between), and a screw tip (which may be radially narrowed with respect to the shaft portion) which is connected to the shaft portion at a front side (with respect to the inserting direction of the wood screw into the base) directly (i.e. without the further component arranged in between) or indirectly (i.e. with the further component arranged in between) for predrilling-freely penetrating into the wood base (i.e. which may be formed to begin a cutting or drilling into an outer surface of a massive wood base), wherein at the shaft portion between neighboring thread turns (i.e. in so-called intermediate thread portions) portions are formed which taper towards the screw tip (i.e. such that at a respective intermediate thread portion, the radius from the screw axis to the surface of the core is larger at the screw head sided end than at the screw tip sided end).

According to a further embodiment of the present invention, a method is provided for inserting a wood screw into a wood base, wherein in the method a screw tip at a front end of the wood screw is applied to the wood base predrilling-freely (in particular applied to a particularly planar outer surface of the not predrilled wood base), the wood screw is driven by actuating a screw head at a back end of the wood screw, to exert an (in particular axial and/or radial) insertion force to the wood screw such that the screw tip penetrates predrilling-freely into the wood base and a thread at a shaft portion of the wood screw between the screw tip and the screw head self-cuttingly cuts a counter-thread into the wood base, wherein at the shaft portion between neighboring thread turns portions are formed which taper towards the screw tip, which radially displace wood material when the wood screw is axially penetrating into the wood base.

According to a yet another embodiment of the present invention, a method of manufacturing a wood screw for predrilling-freely inserting into a wood base is provided, wherein in the method a shaft portion of the wood screw is formed with a thread which is self-cutting in wood, a screw head is formed which is connected to the shaft portion directly or indirectly at a back side, a screw tip is formed which is connected to the shaft portion directly or indirectly at a front side, for predrilling-freely penetrating into the wood base, and portions are formed at the shaft portion between neighboring thread turns which taper towards the screw tip.

According to a further embodiment of the present invention, a wood screw with the above mentioned features is used for particularly predrilling-freely inserting into a wood base.

According to an embodiment, a wood screw is provided which can be anchored into a wood base self-cuttingly and self-drillingly, respectively, without the need of forming a bore hole prior to inserting the wood screw into the wood base. A large holding force is achieved due to the fact that not only the self-cutting thread cuts an anchoring counter-thread into the wood material, but in addition also the portions between the neighboring thread turns, which taper towards the thread tip, displace wood material in a radial direction at a successive axial forward motion of the wood screw and compress it, such that in addition to large regions of the thread flanks also the tapering intermediate thread portions between the thread turns are pressed against the wood material force-lockingly and friction-lockingly, respectively, and therefore increase the anchorage force. The forced forward motion of the screw into the wood base, generated by the self-tapping screwing the thread into the wood base, leads to an additional radial component of the anchorage force due to the tapering of the intermediate thread portions. Thereby, the holding force of the wood screw is improved and the pull-out values are increased, respectively, compared to conventional wood screws. Further, the holding force may additionally be improved without the need of adding further screw core material, descriptively hence by merely relocating screw core material from the front side to the back side. As the tapering direction of the intermediate thread portions coincide with and is identically to, the axial inserting direction of the wood screw into the wood base, respectively, the wedge- and arrow-shaped intermediate thread portions of the inventive wood screw, respectively, displace the surrounding wood material similar to wood screws with a cylindrical core, since the cross-sections have the same size, but the radially enlarged thread flanks assumedly increase the holding force of the wood screw and the changed pressure ratios induced by the inclination of the intermediate thread portions.

Further, it should be noted that conventional screws for plastic and light metal bases, respectively, do not achieve the above mentioned advantageous effects of the wood screws according to exemplary embodiments of the invention, since these, due to the predrilling of sufficiently large bore holes prior to the inserting of a screw, do not attain a radially material displacing contact between intermediate thread portions of such a screw and the bore hole wall. Instead, the fixing effect of such conventional screws is merely based on cutting the thread turns into the bore hole wall. Intermediate thread portions tapering toward the screw tip would, even when they would be used as wood screws, not lead to the above described effect and to an increase of the holding force based thereon.

In the following, additional exemplary embodiments of the wood screw, the method and the use are described.

According to an exemplary embodiment, portions which conically taper towards the screw tip may be formed at the shaft portion between neighboring thread turns. In other words, the intermediate thread portions may be formed as truncated cones with a one-sided axial offset. In particular, intermediate thread portions in a central portion of the thread may be formed identically (particularly with respect to the axial length, the outer diameters and/or the tapering course). This leads to an especially symmetrical configuration and thus to a homogenous force transmission into the wood base.

According to an exemplary embodiment, at the core between neighboring thread turns, portions may be formed which, with respect to a screw axis, curvedly taper, in particular at least in portions concavely and/or convexly curvedly taper towards the screw tip. Due to the curvature properties of the intermediate thread portions, the characteristic of the force transmission into the wood base and therefore the pull-out strength may be fine adjusted.

According to an exemplary embodiment, at the shaft portion between all neighboring thread turns portions may be formed which taper towards the screw tip. Alternatively, only a sub-portion of the shaft portion may be equipped with the portions which taper towards the screw tip, whereas other intermediate thread portions may comprise a circular cylinder-shaped shaft sub-portion or a portion which tapers towards the screw head. Also between the thread turn next to the screw head and the screw head, a portion may be provided which tapers towards to screw tip. Also between the thread turn next to the screw tip and the screw tip, a portion may be provided which tapers towards the screw tip.

According to an exemplary embodiment, the tapering portions (in an axial cross-sectional view) may be pivoted with respect to a screw axis, such that an additional material (of an intermediate thread portion) which is connected to a respective back thread turn and screw head sided thread turn, respectively, is precisely compensated by a lack of material (of the intermediate thread portion), which is connected to the respective front thread turn and screw tip sided thread turn, respectively. In other words, at the thickened region of a tapering portion, compared to a circular cylinder-shaped screw core, exactly the amount of material may be attached, which lacks at the thinned region of the same tapering portion with respect to the circular cylinder geometry of a screw core having the same mass. In sum, the mass of a tapering portion may be equal to the mass of a respective intermediate thread portion which is free of a tapering. This is advantageous, since consequently the tapering portions are manufactured by a pure relocation of material starting with a blank and therefore with a lower effort as it would be the case in a method which applies additional material or in a method which removes material.

According to an exemplary embodiment, the tapering portions may be pivoted (at a virtual pivoting axis perpendicular to the screw axis) with respect to the screw axis, such that the respective tapering portion intersects a mass equivalent circular cylinder core in the center (and therefore preferably at the imaginary pivoting axis) between a respective back thread turn and a respective front thread turn. This measure has advantages in view of an easy manufacturability of the wood screw and a homogenous force transmission into the massive wood base.

According to an exemplary embodiment, a tilting angle of a linear boundary line of at least a part of the tapering portions of the wood screw with respect to a screw axis may be in a range between approximately 5° and approximately 25°, in particular in a range between approximately 10° and approximately 20°. Within this angle range, an especially strong increase of the holding force of the wood screw in the wood base may be achieved, without thereby significantly increasing the screwing in torque of the wood screw into the wood base. The screwing in torque can be understood as the force expended by applying a torque, to screw the screw predrilling-freely into the massive wood base. With too small tilting angles, the increase of the holding force gets too small, whereas with too large tilting angles, the wood screw may become too thin in portions and therefore may be mechanically weakened.

According to an exemplary embodiment, a flank angle of at least a part of the thread turns may be in a range between approximately 30° and approximately 70°, in particular in a range between approximately 40° and approximately 60°. Such flank angles are advantageous for achieving an especially good holding force, since the thread flanks then can efficiently engage the wood.

According to an exemplary embodiment, the screw tip may run to a substantially point-shaped end of the wood screw. According to another exemplary embodiment, the screw tip may comprise at least one cutting edge at an end side. Thus, with regard to the designs of the screw tip, there are different possibilities, wherein the screw tip may be advantageously configured such that the wood screw can be screwed into a massive wood base without predrilling.

According to a first design, the screw tip may be formed as a point-shaped end of the wood screw, wherein the thread may extend directly from the point-shaped end along the shaft portion. Such a design is shown in FIG. 1. If the thread approach begins directly at the point-shaped end, when applying the point-shaped end onto the (in particular not predrilled) surface of a wood base, the thread can engage immediately and start with the self-tappingly and self-cuttingly penetrating into the wood base, respectively. With this design of the screw tip, a predrilling is dispensable and an inserting with low force is enabled, since the forced propulsion of the thread supports a technician right from the start of the applying procedure.

According to an alternative second design, the screw tip may be formed as a drilling tip with at least one cutting edge at the end side. Such a, for example, linear sharp cutting edge may be formed as at least one main cutting edge and can generate a hole into a wooden base, like a drill. Optionally, also at least one cross cutting edge can be provided at the drilling tip, as known by the skilled person in the field of screws and drills.

According to an exemplary embodiment, the screw head may be provided with a drive for rotatingly driving the wood screw. Such a drive serves for a form-locking contact with a tool for screwing in the screw, such as a screwdriver operated by a muscle or an applying device operated by a motor (for example a battery-powered screwdriver). A back end of the screw thus may be formed by the screw head with a drive for rotatingly driving the screw. The drive may be formed as a longitudinal slit, as a cross slit, as a hexagonal recess, as a TORX-drive or as an AW drive.

According to an exemplary embodiment, the tapering portions (when considered that there is no thread) may form a saw tooth structure. Thereby, in particular when the saw tooth structures with respect to each other have a same form and the same dimensions, an especially regular geometry and consequently a regular force transmission into the wood base is ensured.

According to an exemplary embodiment, the shaft portion may comprise a thread-free portion arranged between the screw head and the thread, wherein the one of the tapering portions which is arranged with the smallest distance to the screw head, may form a continuous transition between the thread-free portion and the portion of the shaft portion provided with the thread. Descriptively, the portions which taper towards the front side may extend up to a smooth, thread-free region of the shaft portion. In conventional screws, this very interface between the thread-free portion and the shaft portion forms a location which is prone to cracks, at which an offset and a stage may be formed, respectively, which may act as undesirable weak point, where a crack of the screw due to high mechanical load acting on the screw often occurs. Consequently, screws often rupture at this location conventionally, when they are exposed to excessive mechanical loads. According to the present invention, this can be avoided or at least suppressed by generating a steady, stage-free and homogenous transition, respectively, between the thread-free portion and the thread portion by the rearmost tapered portion in inserting direction (which may yet be positioned in front of the beginning of the thread). Thereby, an undesirable rupture of the wood screw at this location is suppressed and avoided, respectively. In other words, providing the tapered portions may, in addition to the improved holding force, synergistically also improve the mechanical robustness of the wood screw.

According to an embodiment, at the shaft portion in a respective entire axial region between a respective pair of neighboring thread turns, portions may be formed which taper towards the screw tip (this is shown in each of the FIGS. 1 to 6, 8 and 12). In other words, the entire (in particular smooth) axial region which is delimited by each neighboring pair of thread turns, may be free of portions which radially widen towards the screw tip, also only in portions. When the tapering which is formed towards the screw tip extends in the entire portion between respective directly neighboring thread turns continuously, the intermediate thread portions are free of unsteadiness and discontinuities, respectively, such that the advantageous effects described above can develop undisturbedly.

According to an exemplary embodiment, the wood screw may be driven by a rotating actuating of a drive at the screw head. For example, a screwdriver actuated by muscle strength or a motor power driven screwing device may be used to rotatingly insert the wood screw into the wood base. A forced propulsion of the wood screw in the wood base is caused by the self-cutting thread of the wood screw, which enables the axial penetrating of the screw into the wood base with low force.

According to another exemplary embodiment, the wood screw may be driven by exerting a purely or predominantly axial insertion force to the screw head, particularly by nailing in or shooting in. Due to the relatively low thread height of a wood screw according to an exemplary embodiment, a rotating-free inserting of the wood screw into a predrilled or non-predrilled base is possible as well, for example by a bolt push tool which is configured correspondingly.

According to an embodiment, the screw may be formed by cold solid forming (for forming the head and the drive, respectively), pinching (for forming the screw tip) and milling (for forming the thread).

According to an exemplary embodiment, the tapering portions may be formed at least partially when milling the thread. Only a material relocation is carried out, which is sufficient for the forming of the tapering portions, so that attaching or removing material for forming the tapering portions can be omitted.

According to an exemplary embodiment, the tapering portions may be formed at least partially when pinching the screw tip. Also according to this design, the tapered portions may be manufactured without that a separate process step is required for this.

BRIEF DESCRIPTION OF THE DRAWINGS

In the following, exemplary embodiments of the present invention are described in detail with reference to the following figures.

Same or similar components in different figures are provided with the same reference numbers.

DETAILED DESCRIPTION OF ILLUSTRATED EMBODIMENTS

Figure 1:
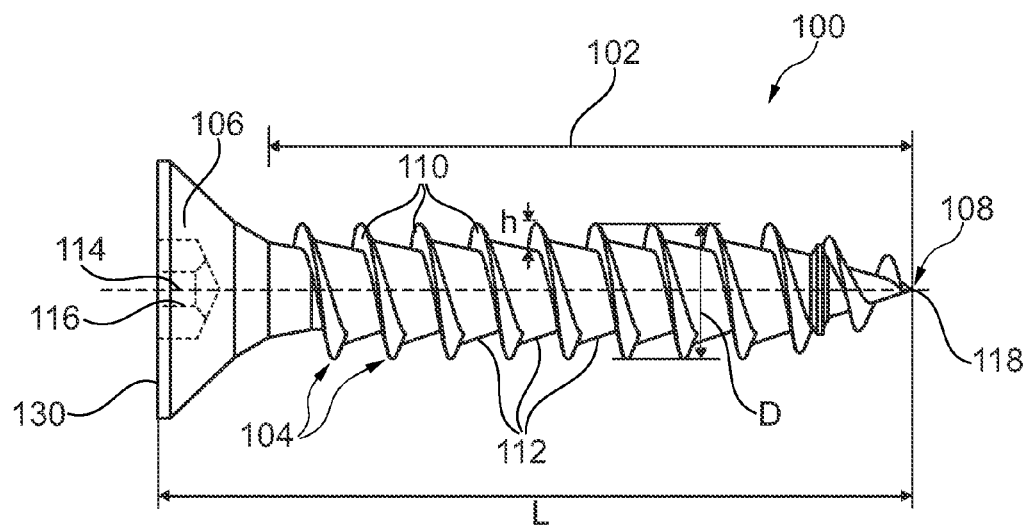
FIG. 1 shows a wood screw according to an exemplary embodiment with a point-shaped screw tip and with truncated cone-shaped thread intermediate portions which taper towards the screw tip.

Before exemplary embodiments of the invention are described with reference to the figures, a few general aspects of the invention shall be explained.

Starting point of the considerations of the present inventors was a wood screw with a circular cylindrical core. However, the present inventors determined that such conventional screws, in view of the pull-out values (i.e. the resistance of the screw against being pulled out of the wood base) and the elongation of breaking torque (i.e. a torque exerted to the screw head with simultaneously clamping the shaft portion, at which torque a undesirably separating in the region of the thread transition occurs), still comprise a potential for improvement.

According to an exemplary embodiment, a screw for wood applications, preferably made of metal, is provided, wherein the core of the wood screw is not formed throughout in parallel to the screw axis, but instead runs in portions, respectively angled, towards the screw tip and the screw axis, respectively. This leads to higher pull-out values. By the described measure, also a higher bearing thread flank is generated at a same outer diameter of the wood screw, as well as a distinct radial pressure. The higher thread flank and the tapering intermediate thread portions may be used for pressure or tension, depending on in which direction they act. Due to the screw core with the intermediate thread portions which taper towards the screw tip, also an especially homogenous transition between the screw head and the thread portion, in particular between a thread-free portion and a thread portion of the wood screw, may be achieved, which leads to a higher elongation at breaking torque. This effect may be utilized in and at the head sided last thread turn, respectively.

Wood screws according to exemplary embodiments of the invention may be formed with symmetrical or asymmetrical thread. In an asymmetrical thread, the rising flank is provided with a different rising angle than the falling flank, whereas in a symmetrical thread, the angle of the rising flank and that of the falling flank are equal. Inventive wood screws may be formed self-cutting and self-tapping into the wood base, respectively. As screw tip for wood screws according to exemplary embodiments, a self-drilling and a self-cutting tip may be used, respectively, which can be pinched or rolled. Wood screws according to exemplary embodiments may for example be made of steel (stainless), carbon steel, etc. The wood screw may be coated (for example waxed) or zinc-coated, or firstly zinc-coated and then waxed, to further improve the sliding properties of the wood screw in the wood base. In view of the inclination of the core portions, different configurations are possible. For example, the pivoting axis, according to which the inclined core portion is tilted with respect to an imaginary, circular cylindrical core portion, may be arranged centrally between two thread turns, such that a material withdrawal in a front screw portion corresponds to a material buildup in an associated back screw portion. The area between the thread turns may be straight or curved, for example concave or convex. The area between the thread turns may comprise two circle segments with different radiuses.

FIG. 1 shows a side view of a surface waxed wood screw 100 made of steel, according to an exemplary embodiment with a shaft portion 102 with a thread 104 between a point-shaped screw tip 118 and a screw head 106. The wood screw 100 has truncated cone-shaped thread intermediate portions or intermediate thread portions 112 which taper towards the screw tip (118), between two respective thread turns 110 of the thread 104.

The wood screw shown in FIG. 1 is designed such that it can be screwed into a massive wood base without the need to generate a predrilling into the wood base (i.e. predrilling-freely) before screwing the wood screw 100 into a massive wood base (not shown). According to exemplary embodiments of the invention, it is actually desirable to omit a predrilling due to the reasons mentioned below, since this leads to especially good pull-out values of the screwed in wood screw 100. The especially good holding force of the wood screw 100 in a massive wood base is based not only on a form-locking engagement between the self-cutting thread 104 of the wood screw 100 on one hand and a counter thread which is self-cutted into the massive wood base, but in addition on a replacement and compression of wood material by the portions and intermediate thread portions 112 which taper towards the screw tip 118, respectively, which on all sides and fully circumferentially around the wood screw friction-lockingly push against the displaced and compressed wood material during the applying procedure and in the applied state of the wood screw 100.

At a back side of the central shaft portion 102 with the thread 104 which is self-cutting in wood, the screw head 106 with a drive 116 directly adjoins in the embodiment according to FIG. 1. The drive 116 is formed such that a rotating tool (not shown) can form-lockingly engage the drive 116, and by subjecting the wood screw 100 with a torque, it can be predrilling-freely screwed into a massive wood base. At a front side—with respect to an applying direction of the wood screw 100—of the shaft portion 102 its thread 104 ends immediately in the point-shaped screw-tip 108 which directly adjoins the thread 104, wherein thereby the predrilling-free screwability of the wood screw 100 into the massive wood base is caused and promoted, respectively.

More precisely, the thread 104 begins in immediate proximity of the screw tip 108 which here is formed as a point-shaped end 118 of the wood screw 100. In other words, the thread 104 of the shaft portion 102 seamlessly merges into the screw tip 108. Thereby it can be achieved that by merely applying the point-shaped tip 118 to the massive wood base and by exerting a moderate pressure and a torque to the drive 116, the point-shaped tip 118 is rotatingly pushed or pressed on the wood base, which then leads to a screwing in of the wood screw 100 and to a self-cutting the counter thread into the wood base.

As previously mentioned, intermediate thread portions 112 which conically taper towards the screw tip 108, here with substantially truncated cone-shaped geometry, are located between neighboring thread turns 110 of the thread 104. These intermediate thread turns 112 are, in combination with the thread 104-screw tip 108-coupling for predrilling-freely inserting the wood screw 100 into a massive wood base, the actual reason for the increased holding force of the wood screw 100 in the wood base. That is to say, when, after applying the point-shaped end 118 to an outer surface of the massive wood base, the wood screw 100 is inserted into the wood base self-drillingly and self-cuttingly by rotatingly driving the drive 116, then the screwing of the thread 104 into the already formed part of the counter thread in the wood base causes a forced propulsion of the wood screw 100 into the wood base. By the resulting combined rotating and axial motion of the wood screw 100 into the wood base, the intermediate thread portions 112 which are inclined with respect to the screw axis 114, inevitably displace and compress wood material and exert a combined axial and radial force to it. In other words, the very intermediate thread portions 112 act partially axially, partially radially upon the wood material, push themselves wedged-shapedly forward through the wood material, press the firm wood fibers and the softer regions of the wood base, which are arranged in between, in a lateral direction and anchor the wood screw 100 firmly into the massive wood base under generation of an additional holding force.

Like in other embodiments of the invention, at the wood screw 100 according to FIG. 1, the axial length L of the wood screw 100, i.e. the distance between the point-shaped end 118 and a front surface 130 of the screw head 106, may be in a range between 8 mm and 2000 mm. An outer diameter D of the shaft portion 102 of the wood screw 100 may be in a range between 2 mm and 16 mm. A thread height h may be in a range between 0.4 mm and 3.2 mm. A core diameter (D-2h), i.e. a largest diameter of the central truncated cone-shaped intermediate thread portions 112, may be in a range between 1.2 mm and 9.6 mm.

Figure 2:
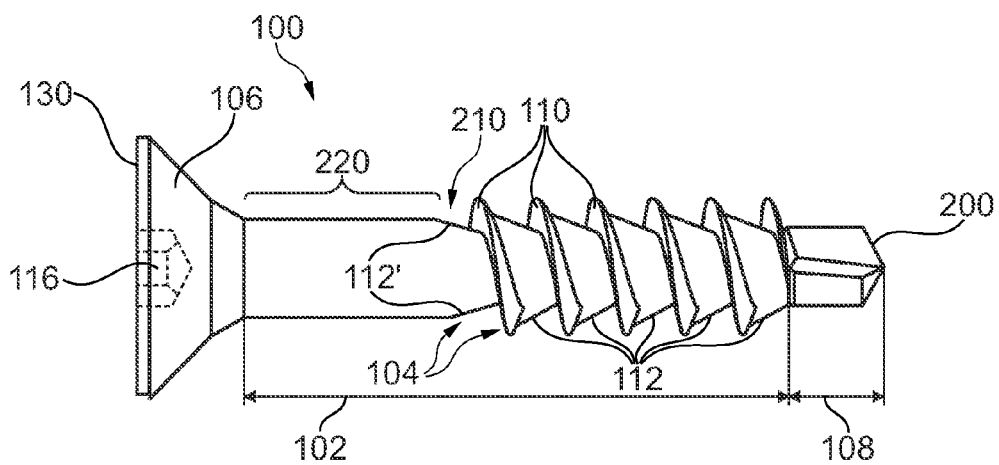
FIG. 2 shows a wood screw according to another exemplary embodiment with a drilling tip with cutting edges and with truncated cone-shaped intermediate thread portions which taper towards the screw tip.

FIG. 2 shows a wood screw 100 according to another exemplary embodiment with a screw tip 108 which is formed as a drilling tip with cutting edges 200 and with truncated cone-shaped thread intermediate portions or intermediate thread portions 112 tapering towards the screw tip 108.

The wood screw 100 according to FIG. 2 most notably differs from the wood screw 100 according to FIG. 1 in view of the following both features.

Firstly, in the inventive wood screw 100 according to FIG. 2, the shaft portion 102 is provided with a thread-free portion 200 at a back side between a back sided end of the thread 104 on the one hand and the screw head 106 on the other hand. The rearmost one of the tapered portions 112', which is arranged with the smallest distance to the screw head 106, forms, according to FIG. 2, a continuous, steady and stage-free transition, respectively, between the thread-free portion 220 and the portion of the shaft portion 102, which is provided with the thread 104. Thereby, a homogenous transition of the screw core in a transition region 210 is created, wherein thereby a breaking torque of the wood screw 100 may be increased significantly. The transition region 210 conventionally represents a weak point of wood screws, at which, when exerting a torsional moment between screw head 106 and screw tip 108, a breaking and turning off of the wood screw takes place, respectively. This is prevented by the form of the rearmost tapering portion 112', which tapers towards the front side, since it synergistically leads also to a more homogenous transition between the thread-free portion 220 and the portion of the shaft portion 102, which is provided with the thread 104.

A second substantial difference between the embodiment according to FIG. 2 and the one according to FIG. 1 is that according to FIG. 2, the screw tip 108 is embodied as drilling tip with cutting edges 200. Like at a drill, the screw tip 108 penetrates into a predrilling-free wood base, wherein the cutting edges 200 cuttingly remove material of the wood base.

It can be taken from FIG. 2, that the intermediate thread portions 112, in portions, comprise a larger outer diameter than the drilling tip 108, such that, due to the intermediate thread portions 112, this again results in displacing and compressing the wood material while forming an increased holding force between the intermediate thread portions 112 and the surrounding wood material.

Figure 3:
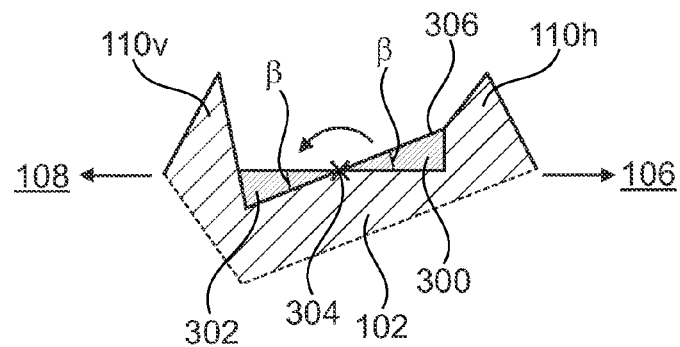
FIG. 3 shows an enlarged illustration of a mass compensated portion which conically tapers towards a screw tip, at an intermediate thread portion of a wood screw according to an exemplary embodiment of the invention.

FIG. 3 shows an enlarged illustration of a mass compensated portion and intermediate thread portion 112, respectively, which conically tapers towards a screw tip 108, at a shaft portion 102 of a wood screw 100, according to an exemplary embodiment of the invention.

FIG. 3 shows an example of a tapering intermediate thread portion 112, that its outer edge 306 in a cross-section is pivoted with respect to a screw axis 114 (cf. FIG. 1), such that an additional material 300 which is connected to a back thread turn 110h, is precisely compensated by a lack of material 302 which is connected to a front thread turn 110v. Thus, the intermediate thread portion 112 is pivoted with respect to the screw axis 114 around a pivoting axis which is perpendicular to a paper axis of FIG. 3 and runs through a center point 304, such that the intermediate thread portion 112 intersects a hypothetical and virtual mass equivalent circular cylinder core, respectively, in the center (cf. center point 304) between the back thread turn 110h and the front thread turn 110v. This shows that in wood screws 100 according to exemplary embodiments, the tapering intermediate thread portions 112 are formed merely by material reforming and material relocation, respectively, from a front screw region to a back screw region. This material reforming and material relocation, respectively, may for example be carried out during the normal manufacturing process of the wood screw 100 by milling. Therefore, an elaborate additional material application process as well as an elaborate material removal process is omitted. Rather, the intermediate thread portions 112 which taper towards the front side may be formed during the normal manufacturing process of the wood screw 100 and therefore without additional expenditure of time. Thus, when the virtual pivoting axis is laid in the center between two thread turns 110, the amount of material is added to the thickened region, which is removed from the thinned region.

Furthermore, FIG. 3 shows that a tilting angle β of the tapered intermediate thread portion 112 with respect to a screw axis 114 may be 15°, for example. In particular with a tilting angle between approximately 5° and approximately 25°, a distinct increase of the holding force can be achieved, without excessively increasing the screwing in torque.

Figure 4:
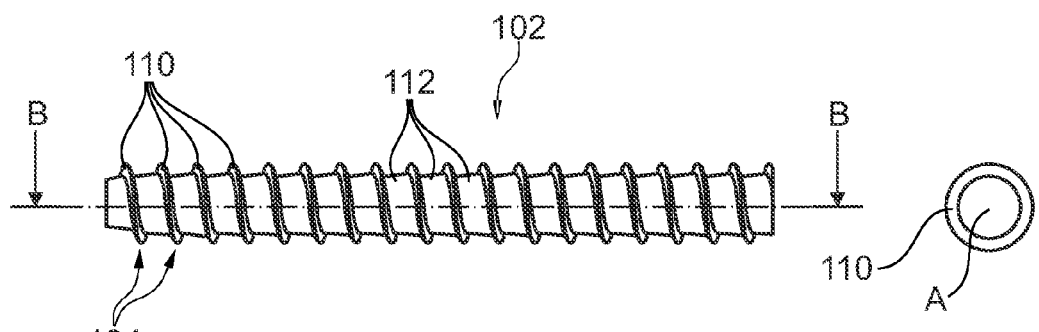
FIGS. 4 to 6 show shaft portions of a wood screw according to an exemplary embodiment of the invention with different zoom factors.
Figure 5:
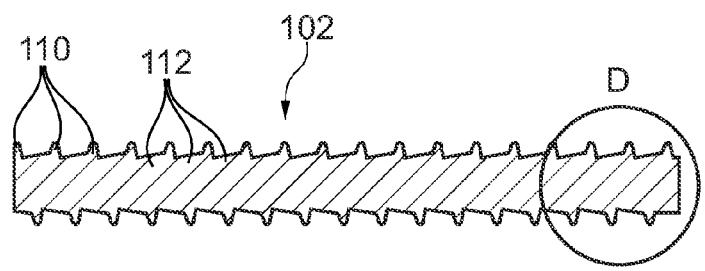
Figure 6:
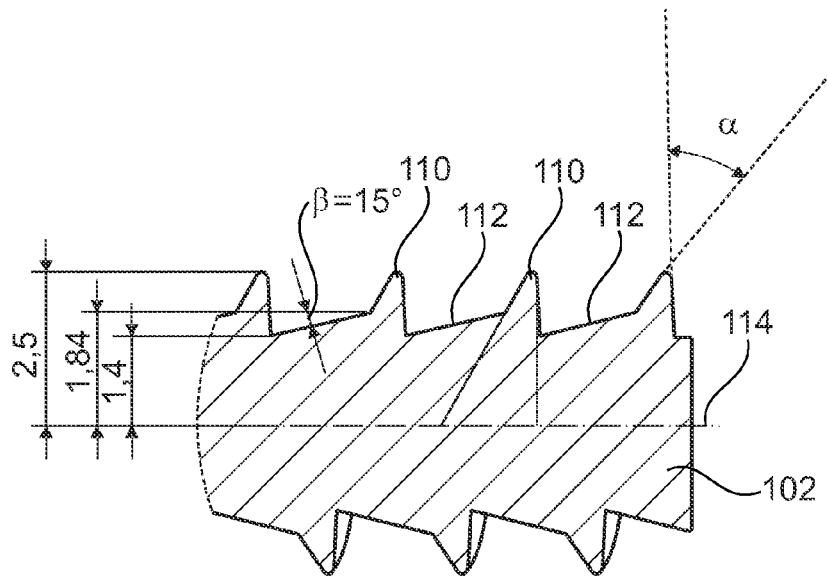

FIG. 4 to FIG. 6 show shaft portions 102 of a wood screw 100 according to an exemplary embodiment of the invention with different zoom factors.

FIG. 4 shows a side view and a cross-section of the shaft portion 102 of the wood screw 100. A cross-sectional area A may be 10.10 mm², for example. FIG. 5 shows a cross-sectional view of the wood screw along an axis B-B according to FIG. 4. FIG. 6 shows an enlarged view of the region of the shaft portion 102 which is denoted as D in FIG. 5. The tilting angle β is 15° in this embodiment. A flank angle α is approximately 50° in this embodiment. A distance between the screw axis 114 and an outer tip of the thread turns 110 is 2.5 mm. A distance between the screw axis 114 and a radial outer end of the widest location of the respective tapered intermediate thread portion 112 is 1.84 mm in the shown embodiment. A distance between the screw axis 114 and a radial outer end of the narrowest location of the respective tapered intermediate thread portion 112 is 1.4 mm in the shown embodiment.

In the following, experimental results will be described which were obtained from a comparison of a wood screw 100 and 110', respectively, with truncated cone-shaped intermediate thread portions 112 according to exemplary embodiments of the invention and a conventional wood screw 800 and 800', respectively, with a circular cylindrical screw core.

Figure 7:
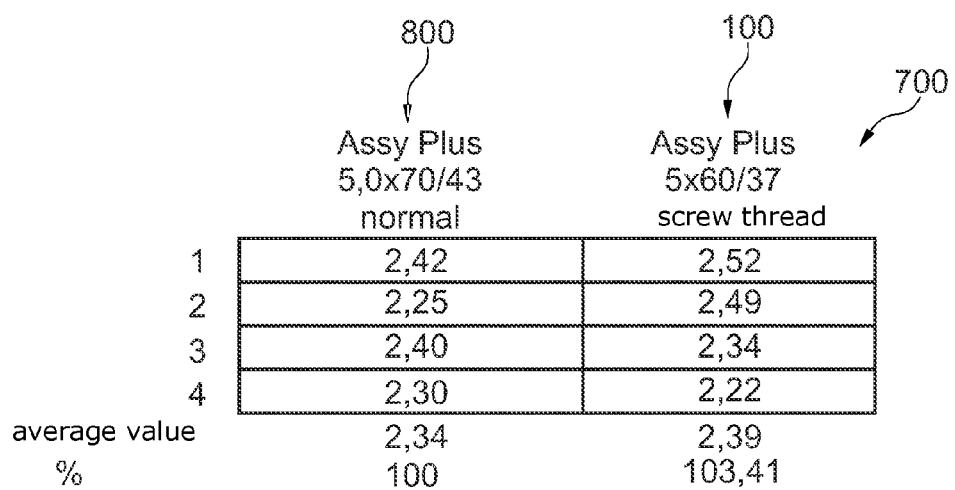
FIG. 7 shows a table in which screwing in torques of a conventional wood screw and a wood screw according to an exemplary embodiment of the invention are contrasted, when predrilling-freely screwing into a beech wood base.
Figure 8:
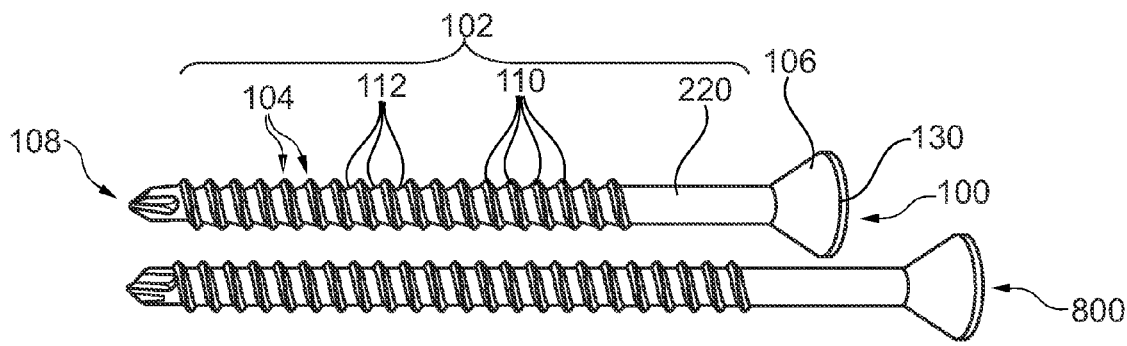
FIG. 8 shows a conventional wood screw and a wood screw according to an exemplary embodiment of the invention, which were used for the experiments according to FIG. 7.

FIG. 7 shows a table 700 in which screwing in torques of the conventional wood screw 800 and the wood screw 100 according to an exemplary embodiment of the invention into a beech wood base are contrasted. FIG. 8 shows the conventional wood screw 800 (without conical intermediate thread portions) and the wood screw 100 (with conical intermediate thread portions 112 and formed with a worm thread, respectively) according to an exemplary embodiment of the invention, which were used for the experiments. With the exception of the tapered portions or intermediate thread portions 112, the wood screws 800 and 800' are identical, respectively (but comprise a different length).

The values of the table of FIG. 7 are indicative for the force which is required for predrilling-freely screwing the respective screw 100, 800 into the beech base. The results was obtained with an screwing in depth of 40 mm with the testing device Spider 8 (with torque detector and angle detector) using a battery-powered screwdriver.

FIG. 7 shows that the inventive wood screw 100 has a screwing in torque which is only increased about 3%, and therefore negligibly increased, with respect to the conventional wood screw 800.

Figure 9:
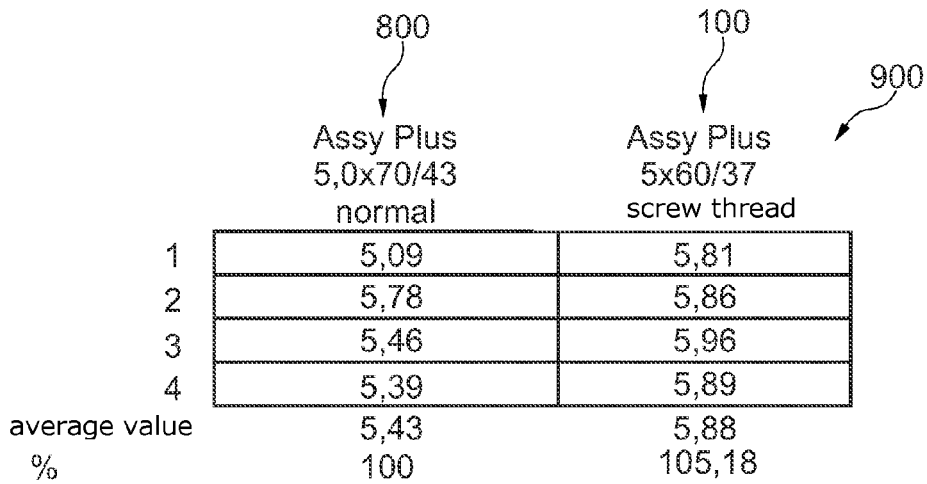
FIG. 9 shows a table in which the pull-out forces of a predrilling-freely screwed in conventional wood screw and a predrilling-freely screwed in wood screw according to an exemplary embodiment of the invention out of a spruce wood base are contrasted.

FIG. 9 shows a table 900 in which the pull-out forces of the conventional wood screw 800 and the wood screw 100 according to the exemplary embodiment of the invention out of a spruce wood base are contrasted.

Thus, it was measured for a spruce wood base, which force is required to pull the predrilling-freely inserted conventional wood screw 800 and the predrilling-freely inserted inventive wood screw 100 out of the spruce wood base. The results were obtained with a screwing in depth of 40 mm with the testing device Spider 8 (with force measuring cell and a travel detector) using a hydraulic cylinder.

The measurement results show that with the inventive wood screw 100 pull-out values could be obtained which are more than 5% improved than with the conventional wood screw 800.

Figure 10:
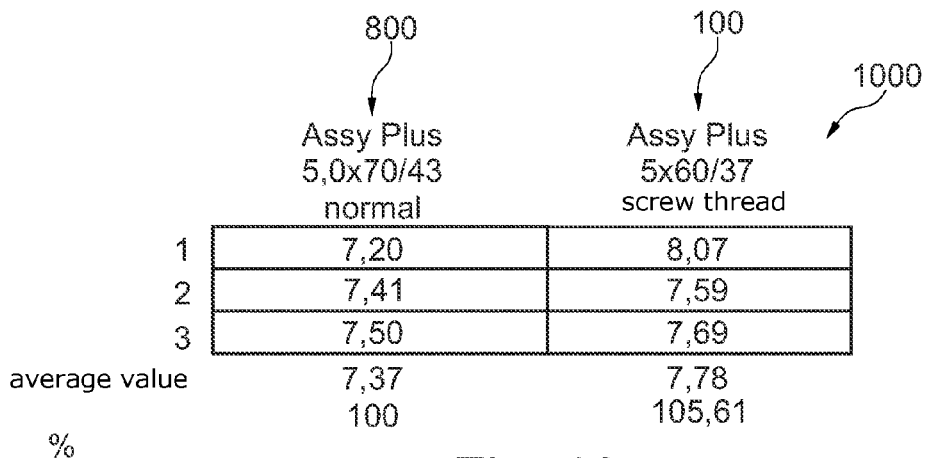
FIG. 10 shows a table in which the pull-out forces of a predrilling-freely screwed in conventional wood screw and a predrilling-freely screwed in wood screw according to an exemplary embodiment of the invention out of a beech wood base are contrasted.

FIG. 10 shows a table 1000 in which the pull-out forces of the conventional wood screw 800 and the wood screw 100 according to the exemplary embodiment of the invention out of a beech wood base are contrasted.

Thus, it was measured for a beech wood base, which force is required to pull the predrilling-freely inserted conventional wood screw 800 and the predrilling-freely inserted inventive wood screw 100 out of the beech wood base. The results were obtained with the testing device Spider 8 (with force measuring cell and travel detector) using a hydraulic cylinder.

The measurement results show that with the inventive wood screw 100 pull-out values can be obtained which are almost 6% improved than with a conventional wood screw 800.

Figure 11:
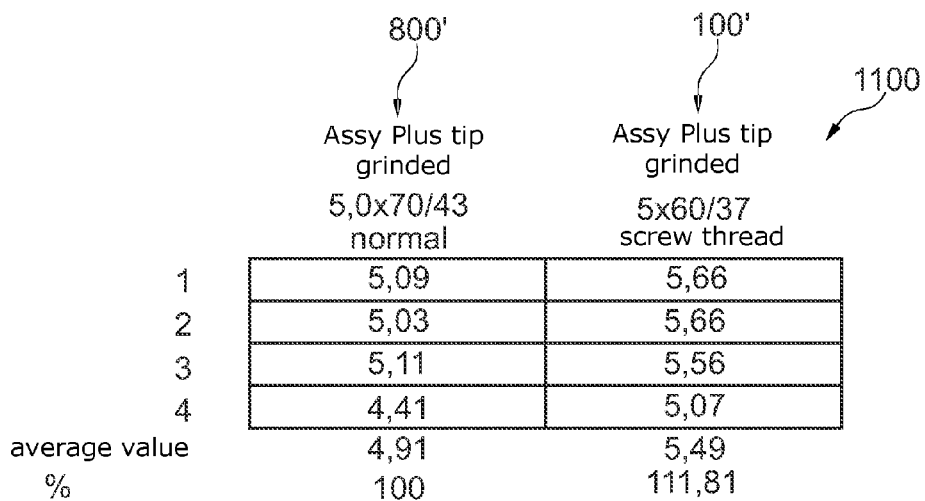
FIG. 11 shows a table in which pull-out forces of a conventional wood screw and a wood screw according to an exemplary embodiment of the invention out of a predrilled spruce wood base are contrasted.
Figure 12:
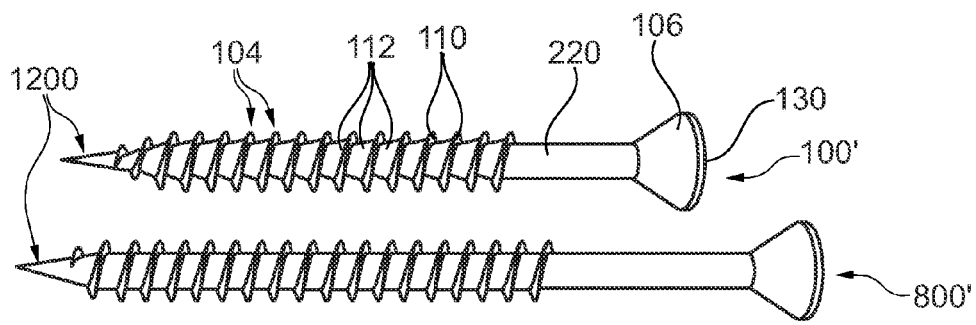
FIG. 12 shows a conventional wood screw and a wood screw according to an exemplary embodiment of the invention, at which respectively the screw tip was grinded.

FIG. 11 shows a table 1100 in which the pull-out values of a conventional wood screw 800' and a wood screw 100' according to an exemplary embodiment of the invention out of a predrilled spruce wood base are contrasted. Both screws 100', 800' were grinded at the screw tip, such that they got an ogival shape. With such an ogival shape, the screws 100', 800' can predrilling-freely nailed or shot into a wood base. However, in the shown experiment, the wood bases were predrilled with a spiral drill to simulate a screw without drilling tip. The diameter of the drill was about the half core diameter with a drilling in depth of 15 mm. FIG. 12 shows the conventional wood screw 800' and the wood screw 100' according to the exemplary embodiment of the invention, in which respectively the screw tip 1200 was grinded.

For the spruce wood base it was measured which force is required to pull the inserted conventional wood screw 800' and the inserted inventive wood screw 100' out of the spruce wood base. The results were measured with a screwing in depth of 40 mm with the testing device Spider 8 (with force measuring cell and travel detector) using a hydraulic cylinder.

The measurement results show, that with the inventive wood screw 100' pull-out values could be achieved which are almost 12% improved than with the conventional wood screw 800'. Descriptively, an inventive 5 screw may achieve the anchorage characteristic of a 5,5 screw, for example.

Supplementary, it should be noted that the term "comprising" does not exclude other elements or steps and "a" does not exclude a plurality. Further, it should be noted that features or steps which are described with reference to one of the above mentioned embodiments may also be used in combination with other features or steps of the embodiments described above. Reference signs in the claims shall not be construed as a limitation.

The invention claimed is:

1. A wood screw for inserting into a massive wood base without predrilling, wherein the wood screw comprises:
    a shaft with a thread which is self-cutting in wood;
    a screw head which is connected to the shaft directly or indirectly at a back side; and
    a screw tip which is connected to the shaft directly or indirectly at a front side for penetrating into the wood base without predrilling,
    wherein the screw tip is formed as a point-shaped end;
    wherein intermediate portions located between more than a half of neighboring thread turns along the shaft are tapered towards the screw tip;
    wherein the intermediate portions form a saw tooth structure; and
    wherein the tapered portions are pivoted with respect to a screw axis such that the respective tapered portion intersects a mass equivalent circular cylinder core in the center between a respective back thread turn and a respective front thread turn.

2. The wood screw according to claim 1, wherein the intermediate portions are cone-shaped.

3. The wood screw according to claim 1, wherein the intermediate portions are curvedly tapered towards the screw tip with respect to a screw axis.

4. The wood screw according to claim 1, wherein more than 75% of the intermediate portions between neighboring thread turns along the shaft are tapered towards the screw tip.

5. The wood screw according to claim 1, wherein the intermediate portions that are tapered are pivoted with respect to a screw axis.

6. The wood screw according to claim 1, wherein a tilting angle of at least a part of the tapered portions with respect to a screw axis is in a range between 5° and 25°.

7. The wood screw according to claim 1, wherein the thread extends from the point-shaped end at least along a part of the shaft portion.

8. The wood screw according to claim 1, wherein the screw tip is formed as a drilling tip with at least one cutting edge at an end side.

9. The wood screw according to claim 1, wherein the screw head is provided with a drive for rotatably driving the wood screw, wherein the drive is formed as a longitudinal slit, as a cross slit, as a hexagonal recess, or as a 6-point star-shaped pattern drive.

10. The wood screw according to claim 1, wherein the shaft portion comprises a threadless portion arranged between the screw head and the thread, wherein one of the tapered portions which is arranged with a smallest distance to the screw head, forms a continuous transition between the threadless portion and the shaft portion provided with the thread.

11. The wood screw according to claim 1, wherein intermediate portions between a respective pair of neighboring threads continuously diminish in diameter along an axis towards the screw tip.

12. The wood screw according to claim 1, wherein a portion of a respective surface of a thread turn is substantially parallel to a front surface of the screw head.

13. The wood screw according to claim 1, wherein at least a portion of a thread turn radiates orthogonally from a screw axis.

14. A method of inserting a wood screw into a massive wood base, the method comprising:
    applying a screw tip at a first end of the wood screw on the massive wood base, wherein the screw tip is formed as a point-shaped end;
    applying an insertion force to the wood screw, such that the screw tip penetrates into the massive wood base; and
    applying a torque to the wood screw such that a thread between the screw tip and a screw head self-cuttingly cuts a counter-thread in the massive wood base,
    wherein intermediate portions of a shaft located between more than a half of neighboring thread turns taper towards the screw tip, which intermediate portions radially displace wood material when the wood screw axially penetrates into the massive wood base, the intermediate portions forming a saw tooth structure; and
    wherein the tapered portions are pivoted with respect to a screw axis such that the respective tapered portion intersects a mass equivalent circular cylinder core in the center between a respective back thread turn and a respective front thread turn.

15. The method according to claim 14, wherein the wood screw is driven by a rotating actuation of a drive at the screw head.

16. The method according to claim 14, wherein the wood screw is driven by exerting a purely axial insertion force to the screw head.

17. A method of manufacturing a wood screw, the method comprising:
    forming a shaft portion of the wood screw with a thread which is self-cutting in massive wood;
    forming a screw head connected to the shaft portion directly or indirectly at a back side;
    forming a screw tip connected to the shaft portion directly or indirectly at a front side, for predrilling-freely penetrating into the massive wood base such that the screw tip is formed as a point-shaped end;
    forming intermediate portions with a surface that tapers towards the screw tip between more than half of the neighboring thread turns along the shaft portion, such that the intermediate portions form a saw tooth structure; and
    wherein the tapered portions are pivoted with respect to a screw axis such that the respective tapered portion intersects a mass equivalent circular cylinder core in the center between a respective back thread turn and a respective front thread turn.

18. The method according to claim 17, wherein the intermediate portions are at least partially formed when milling the thread.

19. The method according to claim 17, wherein the tapering portions are at least partially formed when forming the screw tip.

20. A method for using a wood screw, the method, comprising:
- selecting a wood screw having a shaft with a thread which is self-cutting in massive wood, a screw head which is connected to the shaft directly or indirectly at a back side, and a screw tip which is connected to the shaft directly or indirectly at a front side,
- wherein the screw tip is formed as a point-shaped end, wherein along the shaft intermediate portions between more than a half of neighboring thread turns taper towards the screw tip, the intermediate portions forming a saw tooth structure;
- arranging the wood screw such that the screw tip is proximal to a surface of a massive wood base;
- applying an insertion force for introducing the screw tip into a massive wood base;
- rotating the screw head; and
- wherein the tapered portions are pivoted with respect to a screw axis such that the respective tapered portion intersects a mass equivalent circular cylinder core in the center between a respective back thread turn and a respective front thread turn.

* * * * *